H. J. BANGERT.
MATERIAL SPREADER.
APPLICATION FILED FEB. 19, 1916.

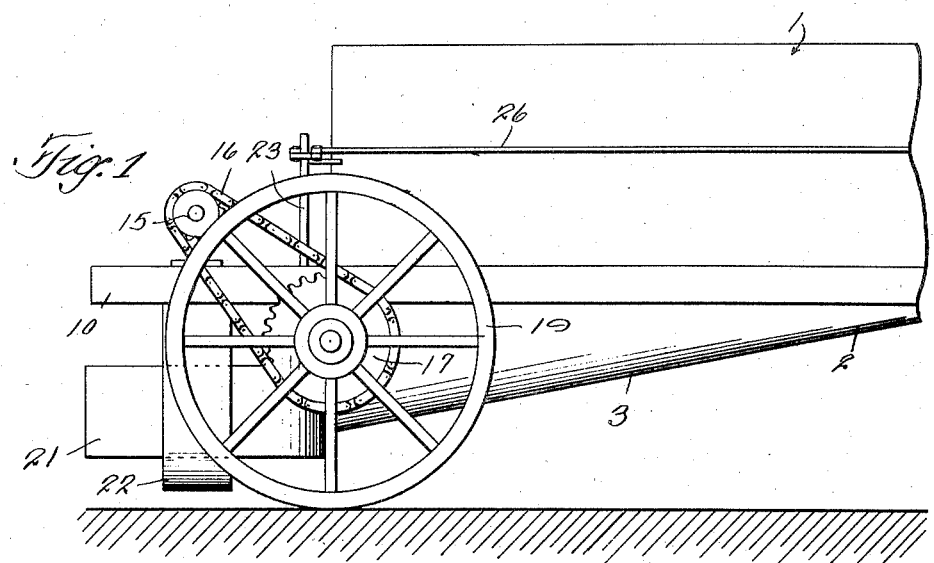
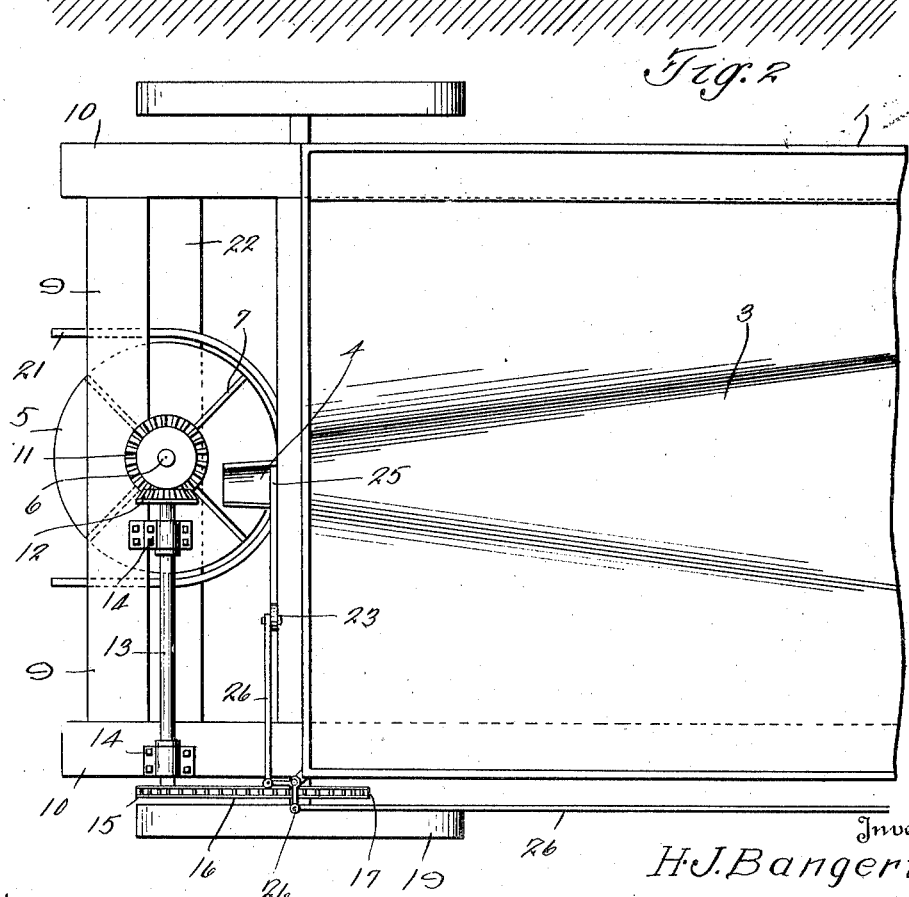

1,312,226.

Patented Aug. 5, 1919.
2 SHEETS—SHEET 2.

Inventor
H. J. Bangert

UNITED STATES PATENT OFFICE.

HENRY J. BANGERT, OF FERGUSON, MISSOURI.

MATERIAL-SPREADER.

1,312,226.  Specification of Letters Patent.  Patented Aug. 5, 1919.

Application filed February 19, 1916. Serial No. 79,358.

*To all whom it may concern:*

Be it known that I, HENRY J. BANGERT, a citizen of the United States, residing at Ferguson, in the county of St. Louis and State of Missouri, have invented certain new and useful Improvements in Material-Spreaders; and I do hereby declare the following to be a full, clear, and exact description of the invention, such as will enable others skilled in the art to which it appertains to make and use the same.

This invention relates to a spreader particularly designed for spreading gravel, sand, crushed rocks and all kinds of material used to build roads, and also for spreading a coat of fine gravel over a freshly applied coat of oil on a roadbed.

The primary object of the invention is to provide a spreader structure which is attached to the rear end of a portable bed for evenly spreading sand, gravel or analogous material over a road surface thereby eliminating the necessity of the employment of manual labor for this purpose, which distributing means includes a rotary dished disk into which the material to be spread is delivered by a spout.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:

Figure 1 is a side elevation of the rear end of the improved spreader.

Fig. 2 is a top plan view of the rear end of the spreader.

Figure 3:
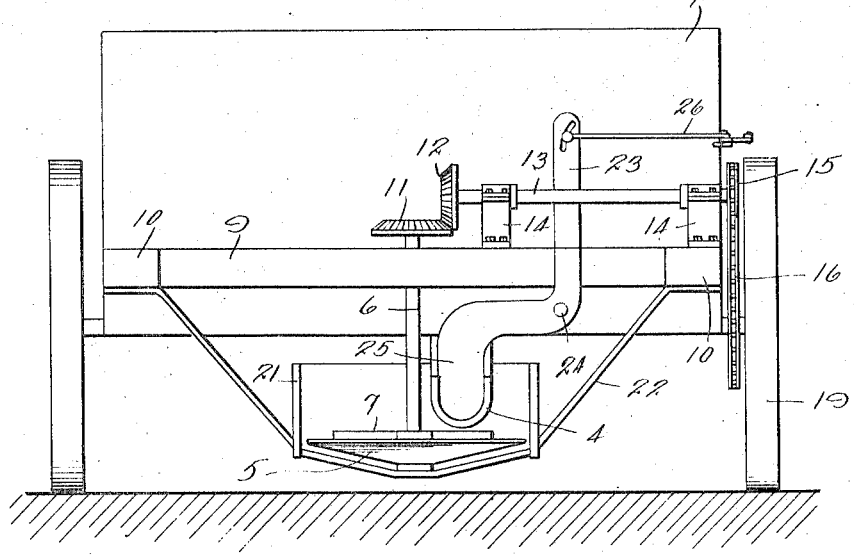
Fig. 3 is a rear elevation of the spreader.
Figure 4:
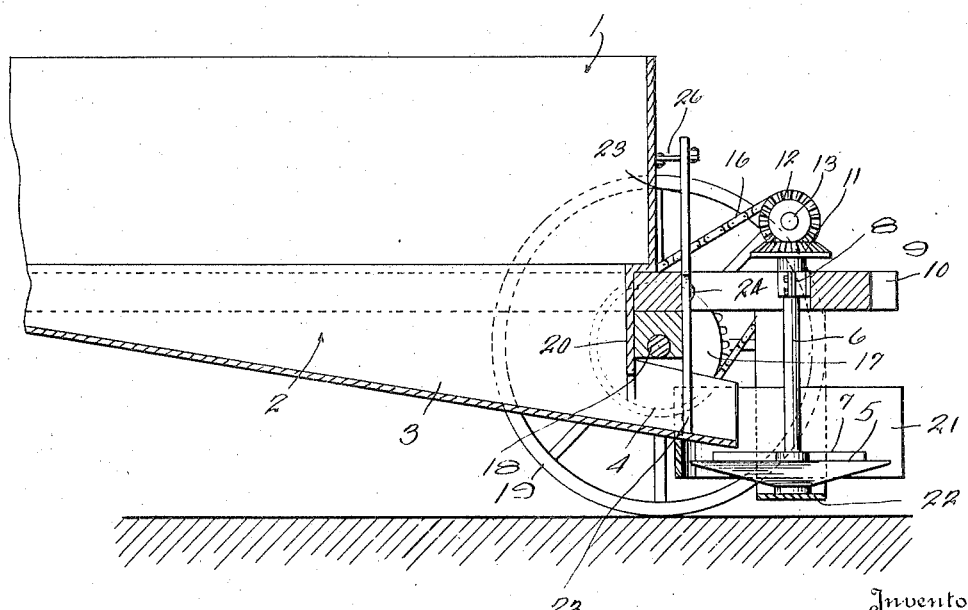
Fig. 4 is a longitudinal section through the spreader.

Referring more particularly to the drawings, 1 designates the body or bed of the spreader, as an entirety which has its bottom 2 struck downwardly intermediate its edges as shown at 3, which down struck portion tapers or converges toward the rear end of the bed 1 and terminates in a chute or trough 4. The delivery end of the chute or trough 4 is positioned above the upper concaved surface of a dished disk 5 which disk is mounted upon a vertical shaft 6. The disk 5 has a plurality of vertical radially extending partitions or arms 7 attached thereto and extending upwardly from its upper surface which partitions engage the material deposited in the disk through the spout or chute 4 and throws it off the disk during the rotation of the latter, for evenly spreading the material over a roadbed. The disk 5 due to its concavity, when rotated at high speed, acts to spray the gravel or other material upwardly and outwardly so as to insure uniform spreading thereof, the upper surface of the disk being open or uncovered so as not to in any way interfere with the upward travel or spraying of the gravel. The shaft 6 is supported by suitable bearings 8 which are attached to a cross bar 9. The cross bar 9 is carried by rearwardly extending braces 10 which are attached to the bed 1. A beveled gear 11 is mounted upon the upper end of the shaft 6 and meshes with a beveled gear 12 which is mounted upon a shaft 13. The shaft 13 is carried by suitable brackets 14 and has a sprocket 15 mounted upon its outer end about which a sprocket chain 16 travels. The sprocket chain 16 also travels about a sprocket 17 which is mounted upon the rear supporting axle 18 of the spreader and rotates with the rear supporting wheel 19 rotating the shafts 13 and 6 by the travel of the spreader. The rear end of the bed 1 extends downwardly into the down struck portion 3, as shown at 20, so as to properly guide the materials into and through the spout or chute 4.

A guard 21 is positioned about the forward portion of the disk 5 and extends along the side of the disk, for properly guiding the travel of the material which is scattered by the rotation of the disk. As will be noted more clearly from Figs. 1 and 2 of the drawings, the guard 21 is of substantial U-shape, the lateral portions of this guard being extended so as to project beyond the rearmost point of the disk thus insuring that the materials will be spread in a well defined strip corresponding in width to the distance between the sides of the guard. The lower end of the shaft 6 is supported by a hanger 22 which depends from the rearwardly extending braces or rails 10, this hanger 22 also providing a support for the guard 21.

A lever 23 is pivotally connected as is shown at 24 to the rear end of the bed 1, and it has its lower end enlarged as is shown at 25, which enlarged end forms a gate or closure for the spout 4 and prevents the material from passing out of the bed 1 into the disk 5. Any suitable mechanism indicated at 26 may be connected to the lever 23 for moving the lever upon its pivotal support for moving the end 25 into or out of a closing position within the spout 4. The stop 4 is provided through one side with a slot which accommodates movement of the enlarged valve member 25 of lever 23, the other side wall of the spout acting as a stop member for positively limiting inward movement of this valve member so as to insure accuracy of operation thereof when moved into position to close the spout.

The travel of the material spreader will, through the medium of the sprockets 17 and 15 and the sprocket chain 16 rotate the shaft 13 which will in turn through the medium of the bevel gears 12 and 11 rotate the vertical shaft 6 and consequently the dished disk 5 which is mounted upon the shaft. When the end 25 of the lever 23 is moved out of the trough 4, the material will pass downwardly through the trough, owing to the incline of the lower portion of the down struck portion 3 of the bottom of the bed 1 to the disk and the rotation of the disk will throw or scatter the material over the surface of a roadbed.

From the foregoing description taken in connection with the accompanying drawings the advantages of construction and of the method of operation of the improved material spreader will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a spreader, a body for containing material to be spread, a horizontally disposed spreader disk rotatably supported by said body at the rear thereof, means for delivering material to be spread onto the upper face of said disk, means for rotating said disk, and a guard member extending about the forward portion and the sides of the disk, said guard member extending rearwardly at each side of the disk beyond the rear edge thereof so as to insure spreading of material discharged from the disk in a well defined strip corresponding in width to the distance between the sides of the guard member.

2. In a spreader, a body for containing material to be spread, braces secured to each side of said body and extending rearwardly thereof, a cross bar carried by said braces, a hanger depending from the braces and disposed in parallelism with the cross bar, a vertical shaft rotatably supported by the cross bar and the hanger, a concavo-convex disk secured on said shaft and having its concave face directed upwardly, means for discharging material from the body onto the upper concave surface of the disk, means for rotating said disk, and a guard carried by said hanger and extending about the forward portion of the disk and the sides thereof, the lateral portions of the guard projecting rearwardly beyond the disk so as to insure spreading of material discharged therefrom in a well defined strip corresponding in width to the distance between the sides of said guard.

In testimony whereof I affix my signature in presence of two witnesses.

HENRY J. BANGERT.

Witnesses:
  GEO. W. WOLFF,
  PETER WETZEL.